United States Patent [19]

Ide

[11] Patent Number: 5,233,345
[45] Date of Patent: Aug. 3, 1993

[54] SELECTIVE CALLING RECEIVER WITH MULTIPLE CLOCK FREQUENCIES FOR RECEIVING LONG MESSAGES

[75] Inventor: Motoki Ide, Tokyo, Japan

[73] Assignee: NEC Corporation, Tokyo, Japan

[21] Appl. No.: 860,025

[22] Filed: Mar. 30, 1992

[30] Foreign Application Priority Data

Mar. 30, 1991 [JP] Japan .................... 3-93372

[51] Int. Cl.[5] ............................................. H04B 7/00
[52] U.S. Cl. ........................... 340/825.44; 340/311.1
[58] Field of Search ........... 340/311.1, 825.44, 825.47, 340/825.48; 455/38.1, 38.2, 38.3, 343

[56] References Cited

U.S. PATENT DOCUMENTS 4,618,860 10/1986 Mori ............................... 340/825.44
4,704,608 11/1987 Sato et al. ...................... 340/825.44
4,758,834 6/1988 Sato et al. ...................... 340/825.47

OTHER PUBLICATIONS

Standard Message Formats for Digital Radio Paging, Post Office Code Standardization Advisory Group (POCSAG), Autumn, 1980.

Primary Examiner—Donald J. Yusko
Assistant Examiner—Dervis Magistre
Attorney, Agent, or Firm—Sughrue, Mion, Zinn, Macpeak & Seas

[57] ABSTRACT

A selective calling receiver includes a decoder having a reference clock oscillator and a CPU having a CPU operating clock oscillator. The decoder includes a timing control circuit for generating a timing signal in synchronism with a synchronizing signal contained in a POCSAG signal and a BCH error correcting circuit for extracting a message code from the POCSAG signal. If the CPU is supplied with a message code from the decoder when no timing signal is inputted from the decoder, the CPU stores the message code in RAM in the CPU or a buffer memory area of external RAM connected to the CPU. In this case, the CPU operates with a first clock signal generated by the reference clock oscillator. When the CPU is supplied with the timing signal from the decoder, the CPU reads the message code from the RAM or the buffer memory area and processes the message code with a second clock signal generated by the CPU operating clock oscillator and the second clock signal has a frequency higher than the frequency of the first clock signal.

10 Claims, 5 Drawing Sheets

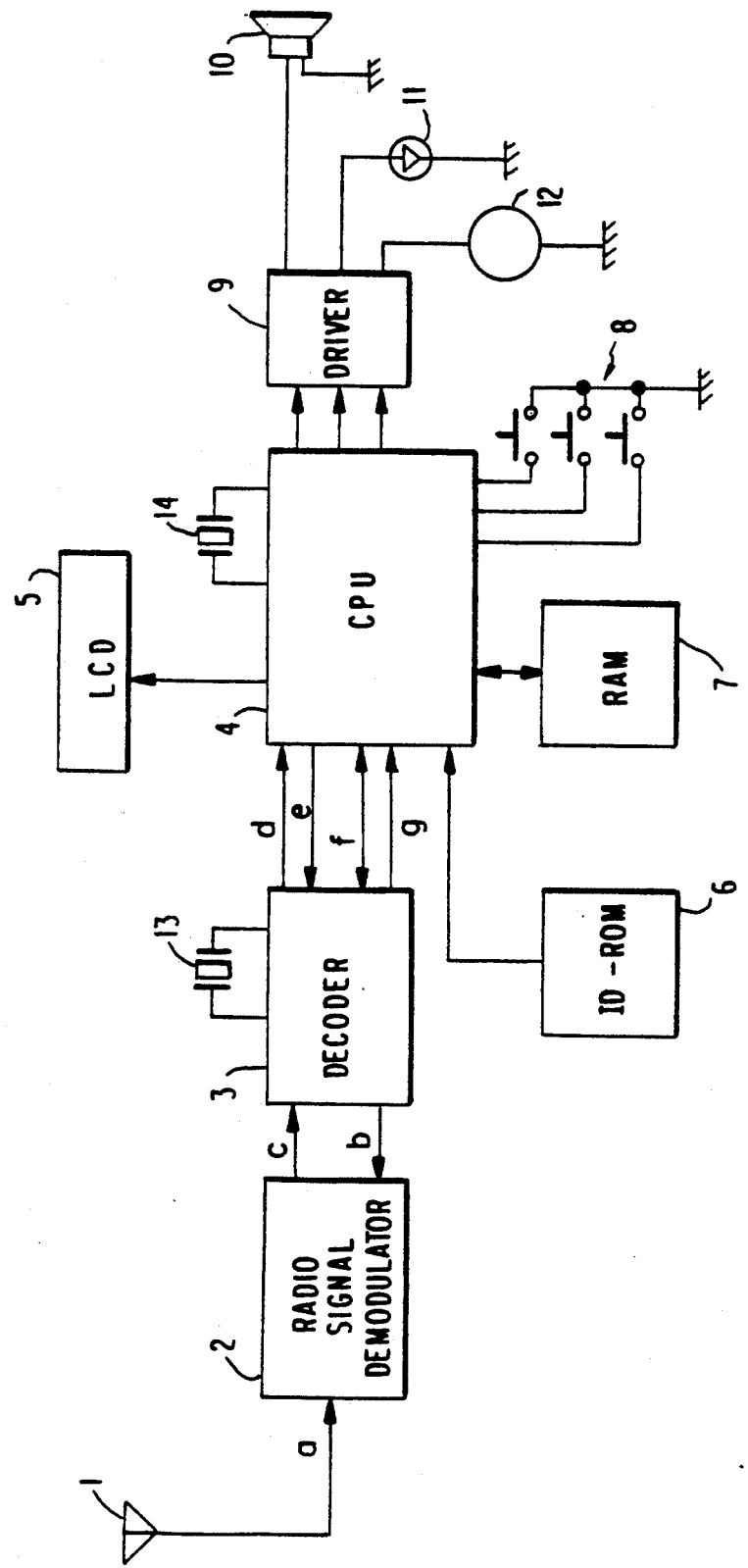

SELECTIVE CALLING RECEIVER WITH MULTIPLE CLOCK FREQUENCIES FOR RECEIVING LONG MESSAGES

BACKGROUND OF THE INVENTION

The present invention relates to a selective calling receiver of the battery saving type.

Various selective calling receivers of the battery saving type have heretofore been proposed in the art. There have also been proposed a variety of formats for selective calling signals used to call selective calling receivers. However, these proposed formats are basically of the same structure. A format for selective calling signals will be described below with reference to FIGS. 1A, 1B, and 1C which show a POCSAG signal described in STANDARD MESSAGE FORMATS FOR DIGITAL RADIO PAGING, Post Office Code Standardization Advisory Group (POCSAG), Autumn, 1980. As shown in FIG. 1A, a POCSAG signal comprises a preamble signal PA composed of 576 bits of alternate "1" and "0", and a plurality of batch signals B. As shown in FIG. 1B, each of the batch signals B comprises a synchronizing signal SC for synchronizing code words, and 16 code words CW1-CW16. As shown in FIG. 1C, the code word CW1 comprises an information bit IB, a check bit CB, and a parity bit PB. The information bit IB of the code word CW1 represents a selective calling code that is a BCH code converted from a selective calling number when MSB=0, and represents a message code that is a BCH code converted from a message when MSB=1. The remaining code words CW2-CW16 are also of the same arrangement.

A call is recognized by the selective calling receiver as follows: As shown in FIG. 1B, the 16 code words CW1-CW16 are divided into 8 groups G1-G8 each composed of two code words. The selective calling receivers of respective users are registered such that each selective calling receiver belongs to any one of the groups G1-G8. If a selective calling receiver belongs to the group G2, for example, the selective calling receiver recognizes a call by determining whether a selective calling code indicative of a selective calling number assigned to the selective calling receiver is contained in the information bits IB of the code words CW3, CW4 of the group G2. For a selective calling receiver which receives the POCSAG signal to recognize a call, it is necessary to receive only two code words CW3, CW4 of the group G2 to which it belongs, and hence the electric current consumed thereby is reduced by this battery saving action. More specifically, the selective calling receiver turns on its receiver circuit only when the code words CW3, CW4 of the group G2 to which it belongs are transmitted, and keeps the receiver circuit turned off otherwise.

The selective calling receiver receives a message as follows: when a message is transmitted, the 16 code words CW1-CW16 are not divided into groups, and the information bits IB of all the code words CW1-CW16 represent message codes. Therefore, when the selective calling receiver receives a selective calling code indicative of a selective calling number assigned to the selective calling receiver, the selective calling receiver interrupts the battery saving action, and begins operating in a mode for continuously receiving the transmitted signal.

Recently, more and more selective calling receivers employ microprocessors for a wider variety of available functions. In such a selective calling receiver, when the microprocessor processes a message while it is receiving a message, the sensitivity with which the selective calling receiver receives transmitted signals may be lowered due to the operation noise of the microprocessor. Therefore, while the selective calling receiver is receiving a message, the microprocessor is deenergized and a message code produced from the received POCSAG signal is temporarily stored in a buffer memory, or while the microprocessor is operating with a low-frequency clock signal, a message code produced from the received POCSAG signal is temporarily stored in a buffer memory, after which the message is processed by the microprocessor.

According to the format of the POCSAG signal shown in FIGS. 1A through 1C, the message may be of any length. Therefore, when a long message is received, the selective calling receiver needs a buffer memory having a large storage capacity. However, an increase in the storage capacity of the buffer memory poses a serious problem because miniaturization is one of the important goals which the selective calling receivers are to attain.

SUMMARY OF THE INVENTION

An object of the present invention is to provide a selective calling receiver capable of receiving long messages without using a memory of large storage capacity.

Other objects of the present invention will become obvious from the following description.

According to the present invention, a selective calling receiver receives a selective calling signal composed of a plurality of batch signals each having a synchronizing signal and a selective calling code or a message code following the synchronizing signal. The selective calling receiver comprises timing signal generating means for extracting the synchronizing signal from the selective calling signal and generating a timing signal in synchronism with the synchronizing signal, message code extracting means for extracting the message code from the selective calling signal, a buffer memory for storing the message code extracted by the message code extracting means, and a microprocessor operable with a first clock signal and a second clock signal having a frequency higher than the frequency of the first clock signal. The microprocessor stores the message code into the buffer memory with the first clock signal if the message code is inputted from the message code extracting means when the timing signal is not inputted from the timing signal generating means, and reads the message code from the buffer memory and processes the message code with the second clock signal when the timing signal is inputted from the timing signal generating means.

BRIEF DESCRIPTION OF THE DRAWINGS

The features and advantages of the present invention will become apparent from the following description when taken in conjunction with the accompanying drawings in which:

FIG. 2 is a block diagram of a selective calling receiver according to the present invention;

DETAILED DESCRIPTION OF THE PREFERRED EMBODIMENT

Figure 1A:
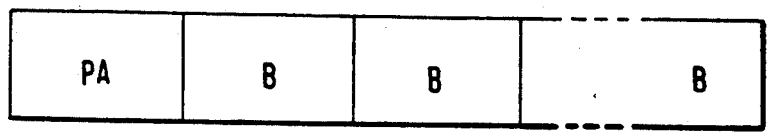
FIG. 1A is a diagram showing the format of a POCSAG signal.
Figure 1B:
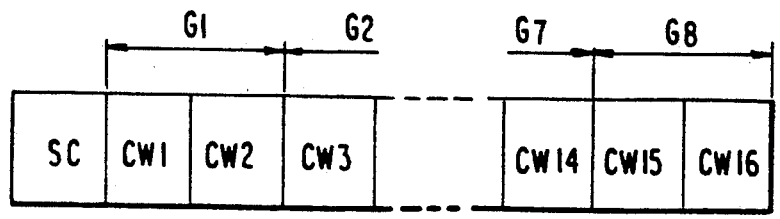
FIG. 1B is a diagram showing each of the batch signals of the POCSAG signal shown in FIG. 1A.
Figure 1C:
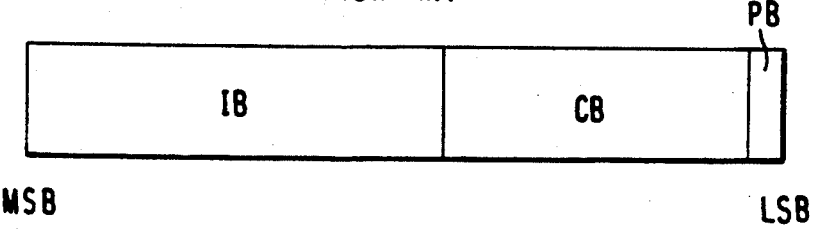
FIG. 1C is a diagram showing the contents of each code word of the batch signals shown in FIG. 1B.

As shown in FIG. 2, a selective calling receiver according to the present invention comprises an antenna 1, a radio signal demodulator 2, a decoder 3 having a reference clock oscillator 13, a CPU 4 comprising a one-chip microcomputer and having a CPU operating clock oscillator 14, an LCD 5 connected to the CPU 4, an ID-ROM 6 connected to the CPU 4, a RAM 7 connected to the CPU 4, a function switch set 8 connected to the CPU 4, a driver 9 connected to the CPU 4, a loudspeaker 10 connected to the driver 9, an LED 11 connected to the driver 9, and a vibrator 12 connected to the driver 9.

Figure 3:
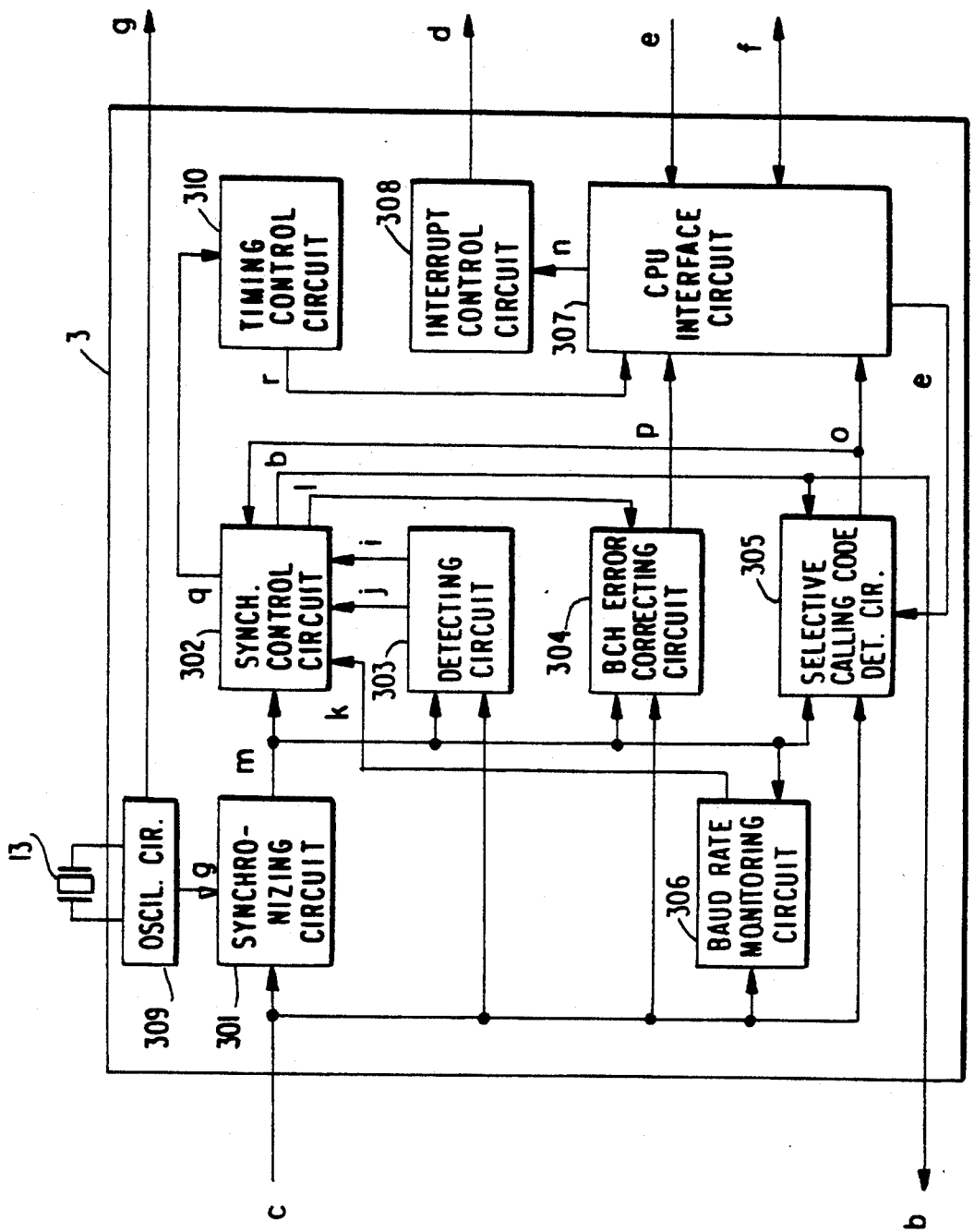
FIG. 3 is a block diagram of a decoder in the selective calling receiver shown in FIG. 2.

As shown in FIG. 3, the decoder 3 comprises an oscillation circuit 309 to which the reference clock oscillator 13 is connected, a bit synchronizing circuit 301, a Baud rate monitoring circuit 306, a synchronization control circuit 302, a detecting circuit 303, a BCH error correcting circuit 304, a selective calling code detecting circuit 305, a timing control circuit 310, an interrupt control circuit 308, and a CPU interface circuit 307.

Operation of the selective calling receiver shown in FIG. 2 will be described below.

A modulated signal a of a POCSAG signal transmitted from a transmitting station is received by the antenna 1. The received modulated signal a is demodulated into demodulated data c by the radio signal demodulator 2. The demodulated data c is applied to the bit synchronizing circuit 301 of the decoder 3. The bit synchronizing circuit 301 generates a reproduced clock signal m when a preamble signal PA contained in the demodulated data c and a reference clock signal g sent from the oscillation circuit 309 are locked in phase. The demodulated data c is also applied to the detecting circuit 303. The detecting circuit 303 samples the preamble signal PA contained in the demodulated data c with the reproduced clock signal m from the bit synchronizing circuit 301. When the detecting circuit 303 detects the preamble signal PA of the POCSAG signal from the demodulated data c, the detecting circuit 303 outputs a first detected signal i to the synchronization control circuit 302. The demodulated data c is also supplied to the Baud rate monitoring circuit 306. The Baud rate monitoring circuit 306 compares the Baud rate of the demodulated data c and the Baud rate of the POCSAG signal to be received. If the compared Baud rates are the same, the Baud rate monitoring circuit 306 outputs a detected Baud rate signal k to the synchronization control circuit 302. When the first detected signal i or the detected Baud rate signal k is supplied to the synchronization control circuit 302, the synchronization control circuit 302 keeps a battery saving signal b high in level in order to start detecting a synchronizing signal SC that is transmitted following the preamble signal PA. As a consequence, the radio signal demodulator 2 continues to receive transmitted signals.

When the synchronizing signal SC transmitted following the preamble signal PA is detected from the demodulated data c by the detecting circuit 303, the detecting circuit 303 outputs a second detected signal j to the synchronization control circuit 302. In response to the second detected signal j, the synchronization control circuit 302 makes the battery saving signal b low in level in order to demodulate the modulated signal a only in timed relation to the group G2 to which the selective calling receiver belongs. As a result, the radio signal demodulator 2 performs a battery saving action.

Figure 4A:
FIG. 4 A-G is a timing chart illustrative of the manner in which the selective calling receiver shown in FIG. 2 operates.
Figure 4B:
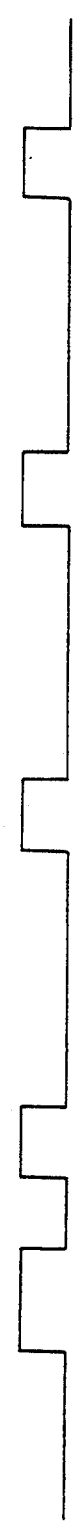
Figure 4C:
Figure 5:
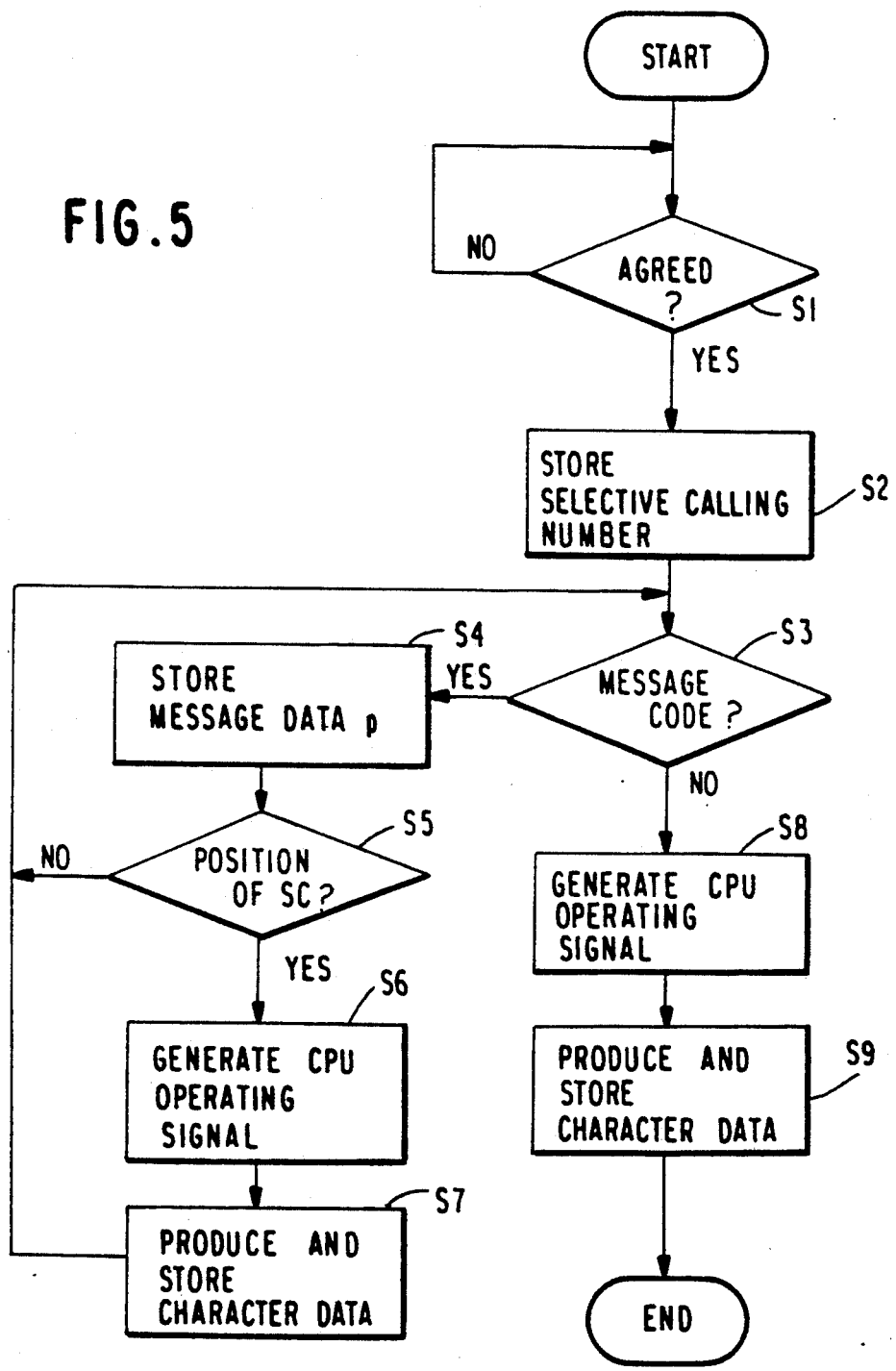
FIG. 5 is a flowchart of an operation sequence of a CPU in the selective calling receiver shown in FIG. for receiving a message.

The demodulated data c and the battery saving signal b are also applied to the selective calling code detecting circuit 305. The selective calling code detecting circuit 305 compares a selective calling code contained in the demodulated data c with its own selective calling numbers. At this time, the selective calling receiver usually has a plurality of selective calling numbers as its own selective calling numbers, and these selective calling numbers are stored in the ID-ROM 6. The selective calling numbers are read from the ID-ROM 6 by the CPU 4, and then sent to the selective calling code detecting circuit 305 when the CPU 4 is turned on. If any one of the selective calling numbers transmitted from the CPU 4 is not the same as the selective calling code in the selective calling code detecting circuit 305, the battery saving signal b is rendered low again as shown in FIG. 4(B). As a result, the radio signal demodulator 2 continuously performs the battery saving action. If any one of the selective calling numbers transmitted from the CPU 4 agrees with the selective calling code in the selective calling code detecting circuit 305, the battery saving signal b is kept high as shown in FIG. 4(C). As a result, the radio signal demodulator 2 continuously receives transmitted signals. At this time, a detected agreement signal o is outputted from the selective calling code detecting circuit 305 to the CPU interface circuit 307 and also to the CPU 4 through an address bus e and a data bus f, the CPU 4 having been monitoring whether a detected agreement signal o is inputted or not in a step S1 (FIG. 5). When the detected agreement signal o is applied to the CPU 4, the selective calling number which agreed with the selective calling code is stored in a RAM in the CPU 4 or the external RAM 7 in a step S2 (FIG. 5).

The detected agreement signal o is also supplied from the selective calling code detecting circuit 305 to the synchronization control circuit 302. The synchronization control circuit 302 keeps the battery saving signal b high, as shown in FIG. 4(C), so as to start receiving a message contained in the demodulated data c. As a consequence, the radio signal demodulator 2 continuously receives transmitted signals. A message reception starting signal 1 is outputted from the synchronization control circuit 302 to the BCH error correcting circuit 304, to which the demodulated data c is also inputted. When a BCH error correcting circuit 304 is supplied with the message reception starting signal 1, the BCH error correcting circuit 304 effects an error correcting operation on information bits IB using check bits CB and parity bits PB contained in the respective code words CW1-CW16 of the demodulated data c. After the error correcting operation, the information bits IB are supplied as message data p for the respective code words CW1-CW6 to the CPU interface circuit 307.

The message data p supplied to the CPU interface circuit 307 is outputted through the address bus e and the data bus f to the CPU 4.

The CPU 4 determines whether the message data p represents a selective calling code or a message code in a step S3 (FIG. 5), based on the value of the MSB of the message data p. If the message data p represents a message code, then the message data p is stored in the RAM in the CPU 4 or a buffer memory area in the external RAM 7 in a step S4 (FIG. 5). The message data p is stored by the CPU 4 using the reference clock signal g from the decoder 3 as an operation clock signal.

Figure 4D:
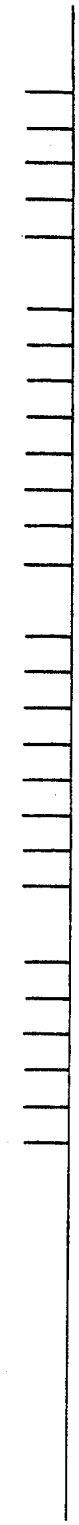
Figure 4E:
Figure 4F:
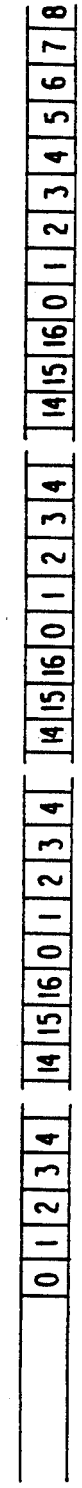
Figure 4G:

The synchronization control circuit 302 has a word counter (not shown) that is reset by the second detected signal j and operates such that the count q of the word counter corresponds to the sequence of the code words CW1-CW16 of the demodulated data c, as shown in FIG. 4(F). Therefore, the timing control circuit 310 of the decoder 3 can generate a timing signal r which goes high when the count q is "0" by decoding the count q, as shown in FIG. 4(G). At this time, there is one-to-one correspondence between the periods in which the timing signal r is high in level and the positions of the synchronizing signals SC of the POCSAG signal. The timing signal r is applied to the CPU interface circuit 307, and then outputted to the CPU 4 through the address bus e and the data bus f.

The CPU 4 determines the positions of the synchronizing signals SC of the POCSAG signal based on the timing signal r transmitted from the decoder 3 in a step S5 (FIG. 5). At the positions of the synchronizing signals SC, the CPU 4 switches from the reference clock signal g to a CPU operating clock signal generated by the CPU operating clock generator 14 in a step S6 (FIG. 5). Thereafter, the message data p stored in the RAM in the CPU 4 or the buffer memory area of the external RAM 7 is read and converted into character data by the CPU 4 with the CPU operating clock signal, and the character data is then stored in the RAM in the CPU 4 or a message memory area of the external RAM 7 with the CPU operating clock signal in a step S7 (FIG. 5). The frequency of the CPU operating clock signal is set to a value high enough for the conversion from the message code into the character data in the CPU to be completed within the periods of the synchronizing signals SC of the POCSAG signal even when all the 16 code words CW1-CW16 contain message codes. Therefore, even when message codes are transmitted over several batch signals B as shown in FIG. 4(A), since the message code can be converted into character data with respect to each of the batch signals B, the RAM in the CPU 4 or the buffer memory area of the external RAM 7 will be of sufficient storage capacity to store a maximum number of bits of the message code contained in one batch signal B. Upon completion of the conversion into character data, the CPU 4 switches from the CPU operating clock signal to the reference clock signal g. The message data p extracted from the next transmitted batch signal B is then similarly converted into character data.

When the transmission of message codes is finished, the CPU 4 switches from the reference clock signal g to the CPU operating clock signal in a step S8 (FIG. 5). The message data p stored in the RAM in the CPU 4 or the buffer memory area of the external RAM 7 is read and converted into character data by the CPU 4 with the CPU operating clock signal, and the character data is then stored in the RAM in the CPU 4 or the message memory area of the external RAM 7 with the CPU operating clock signal in a step S9 (FIG. 5). Thereafter, the process of processing the message with the CPU 4 is ended. When the process of processing the message comes to an end, a signal indicating the reception of the message is sent from the CPU 4 through the driver 9 to the loudspeaker 10, the LED 11, or the vibrator 12, letting the user know that a message has been receive. The character data stored in the RAM in the CPU 4 of the message memory area of the external RAM 7 is displayed on the LCD 5. The loudspeaker 10, the LED 11, or the vibrator 12 is selected based on preset information stored in the ID-ROM 6 and preset signals from the function switch set 8. The function switch set 8 may be preset to display the character data again on the LCD 5.

The periods in which the CPU 4 operates with the CPU operating clock signal during the process of processing the message are indicated by pulses in FIG. 4(E). While the message is being processed, an interrupt signal is supplied from the interrupt control circuit 308 in the decoder 3 to the CPU 4 over an interrupt signal line d at the times shown in FIG. 4(D). Therefore, the CPU 4 may store the message data p in the RAM in the CPU 4 or the message memory area of the external RAM 7 in synchronism with the interrupt signal.

In the embodiment shown in FIG. 2, a message is transmitted continuously with respect to the code words CW1-CW16. However, the selective calling receiver according to the present invention may be of the same arrangement even when a message is transmitted discretely with respect to the code words CW1-CW16.

While this invention has been described in conjunction with the preferred embodiments thereof, it will now readily be possible for one skilled in the art to put this invention into practice in various other manners.

What is claimed is:

1. A selective calling receiver for receiving a selective calling signal composed of a plurality of batch signals each having a synchronizing signal and a selective calling code or a message code following said synchronizing signal, comprising:

timing signal generating means for extracting said synchronizing signal from said selective calling signal and generating a timing signal in synchronism with said synchronizing signal;

message code extracting means for extracting said message code from said selective calling signal;

a buffer memory for storing said message code extracted by said message code extracting means; and a microprocessor operable with a first clock signal and a second clock signal, said second clock signal having a frequency higher than the frequency of said first clock signal;

said microprocessor comprising means for storing said message code into said buffer memory with said first clock signal if said message code is inputted from said message code extracting means when said timing signal is not inputted from said timing signal generating means to said microprocessor, and for reading said message code form said buffer memory and processing said message code with said second clock signal when said timing signal is inputted from said timing signal generating means to said microprocessor.

2. A selective calling receiver according to claim 1, wherein a selective calling number of said selective calling receiver is registered in advance, further comprising decision means for extracting said selective calling code from said selective calling signal, comparing said extracted selective calling code with said selective calling number, and generating a detected agreement signal when said selective calling code and said selective calling number agree with each other, said microprocessor comprising means for storing said message code into said buffer memory with said first clock signal if said message code is inputted from said message code extracting means when said timing signal is not inputted from said timing signal generating means to said microprocessor, and for reading said message code from said buffer memory and processing said message code with said second clock signal when said timing signal is inputted from said timing signal generating means to said microprocessor, in the event of application of said detected agreement signal from said decision means to said microprocessor.

3. A selective calling receiver according to claim 2, wherein said selective calling signal comprises a POCSAG signal.

4. A selective calling receiver according to any one of claims 1 through 3, wherein said buffer memory has a storage capacity for storing a maximum number of bit of said message code contained in one of said batch signals.

5. A selective calling receiver according to any one of claims 1, 2, or 3, wherein said microprocessor comprises means for processing said message code by converting said message code into character data.

6. A selective calling receiver according to claim 5, further including display means for displaying said character code.

7. A selective calling receiver according to any one of claims 1, 2, or 3, further including indicating means for indicating reception of said message code.

8. A selective calling receiver according to any one of claims 1, 2, or 3, wherein said second clock signal has a frequency high enough for said microprocessor to complete the processing of all message codes stored in said buffer memory within the period of said synchronizing signal.

9. A paging receiver for receiving a calling signal including a synchronization code signal and a message code signal, said paging receiver comprising:

decoder means (3) for decoding said calling signal and for detecting said synchronization code signal to produce a decoded message signal and a timing signal according to said synchronization code signal;

memory means (7) coupled to said decoder means for storing said decoded message signal;

clock means for generating a clock signal in response to said timing signal; and message process means (4) coupled to said memory means and responsive to said clock signal for processing said stored message signal in said memory means.

10. A paging receiver for receiving a calling signal including a synchronization code signal and a message code signal, said paging receiver comprising:

decoder means (3) for decoding said calling signal and for detecting said synchronization code signal to produce a decoded message signal and a timing signal according to said synchronization code signal;

memory means (7) coupled to said decoder means for storing said decoded message signal;

switch means for switching a clock signal in response to said timing signal; and message process means (4) coupled to said memory means and responsive to said switched clock signal for processing said stored message signal in said memory means.

* * * * *